Aug. 10, 1965  E. L. McMULLIN  3,200,187

LINE COVER

Filed May 22, 1963

INVENTOR.
EARL L. McMULLIN
BY
Woodhams, Blanchard & Flynn
ATTORNEYS

United States Patent Office 3,200,187
Patented Aug. 10, 1965

3,200,187
LINE COVER
Earl L. McMullin, Rutland Township, Barry County,
Mich. (R.R. 2, Hastings, Mich.)
Filed May 22, 1963, Ser. No. 282,260
6 Claims. (Cl. 174—5)

This invention relates to a protective cover which is adapted to encompass completely a portion of an energized electrical transmission line in order to protect a lineman from accidental contact with the line while he is working near said portion.

Power company linemen are frequently called upon to work on poles and towers close to energized electrical transmission lines carrying very high potentials. It is customary for the linemen to place protective covers around the portions of the transmission lines in the immediate area in which they are working in order to reduce the hazards involved. A wide variety of protective covers have been offered to the trade for this purpose and several types are in common use. It has been observed, however, that many of the prior protective covers are somewhat awkward to mount on and remove from the transmission lines and some of the covers are built so that the lineman may contact the transmission line through the wall of the cover and be seriously inpured, should the cover become slightly broken or cracked. This is a very serious problem because the lineman is relying upon the cover for his safety and, therefore, is not giving as much attention to the line as he normally would in the absence of the cover.

Many of the prior types of protective covers are mounted by placing the cover over the line and then twisting portions of the cover around the line in a special and complicated way. Usually, the cover is twisted in a generally spiral pattern in order to move the line into an inner casing where it is fully enclosed and closely held. Others require relative rotation of various parts of the cover in order to enclose the line fully. Both of these procedures require the lineman to be close to the energized line and, consequently, they are necessarily carried out carefully and rather slowly.

Accordingly, there exists a need for a protective cover which can be easily and conveniently mounted on and removed from a transmission line by the lineman while he is a safe distance away from the energized line.

As mentioned above, the energized line contacts the interior surface of the casing of some covers along the entire length thereof, thereby endangering the lineman. While an alternative to this is to use a double-walled protective cover, so that the energized line can be placed within the inner wall, this arrangement introduces additional expense and difficulties in mounting and dismounting the cover. Also, if the energized line contacts the interior surface of a wall in the cover along its entire length, substantial frictional drag is developed when the cover is moved along the energized line and when the cover parts are moved with respect to each other during mounting or dismounting thereof.

Accordingly, it is an object of this invention to provide an improved protective cover for electrical transmission lines and the like.

It is a further object of this invention to provide an improved protective cover, as aforesaid, which can be mounted and dismounted easily and conveniently by a lineman located an appreciable, safe distance from the line.

It is a further object of this invention to provide an improved protective cover, as aforesaid, which has a plurality of spaced elements, which engage the line in such fashion that the line is spaced from the casing of the cover and is insulated therefrom so that no harm to the lineman will occur if he should touch the casing, even though the casing might be slightly broken or cracked.

It is a further object of this invention to provide an improved protective cover, as aforesaid, which is relatively lightweight and easy to manipulate, yet which is rugged and durable so as to be capable of withstanding rough usage.

It is a further object of this invention to provide an improved protective cover, as aforesaid, which is relatively inexpensive to manufacture and to maintain.

Other objects and advantages of the invention will become apparent to persons acquainted with equipment of this type upon reading the following disclosure and inspecting the accompanying drawings.

Figure 1:
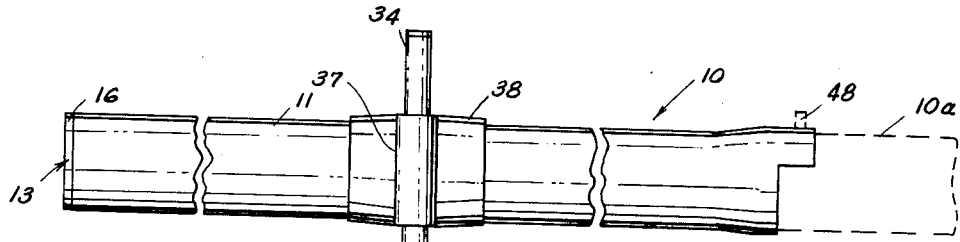
FIGURE 1 is a broken, side elevational view of the improved protective cover to which the invention relates.
Figure 2:
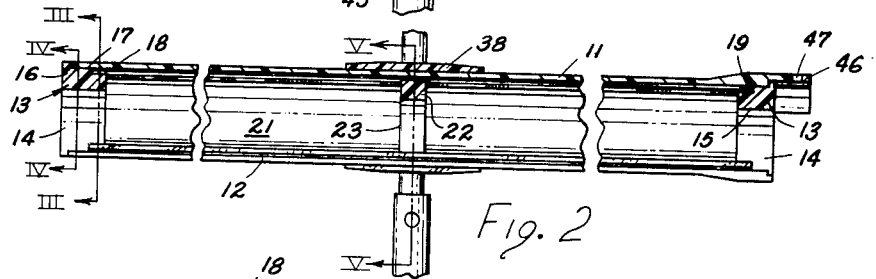
FIGURE 2 is a broken, central sectional view of the protective cover taken along the line II—II of FIGURE 5.

Referring to the drawing, the improved protective cover 10 to which the invention relates is comprised of an elongated, outer, tubular casing 11 having a lengthwise opening 12 through the wall thereof and which opens downwardly and extends along the entire length thereof. The opening 12 is at least as wide as the diameter of the largest transmission line T with which the cover is to be used so that, when said opening is uncovered, the transmission line can be received therethrough into the interior of the casing 11.

A pair of end plugs 13 are fixedly mounted on the casing 11 and are located therewithin adjacent the opposite ends thereof. The plugs 13 are made of insulating material and preferably are molded of fiber glass reinforced molding compound, hard rubber, phenol-formaldehyde plastic or similar insulating material. Each of the plugs 13 has a slot 14 extending part way therethrough, which slot is aligned with the opening 12 so that the transmission line can be received into said slot. The radial depth of the slot 14 is such that the closed inner end wall 15 of the slot is spaced an appreciable distance from the interior surface of the casing 11. Thus, when the transmission line engages the end wall 15 of the slot 14, said line is spaced a safe distance from the casing 11 and is insulated therefrom by the plugs 13.

The end plugs 13 are identical and each has a flange 16 at the outer axial end thereof which flange abuts the end of the casing 11. Each plug 13 also has an intermediate portion 17 which snugly fits within the casing 11 and is fixedly secured thereto, such as by a suitable adhesive. The plug 13 also has a portion 18 of reduced diameter at its inner axial end. The portion 18 terminates at its outer axial end in a shoulder 19 and the external surface of the portion 18 is spaced a predetermined distance from the internal surface of the casing 11. The portion 18 serves as a bearing for a slidable closure member 21, as hereinafter further described.

Figure 3:
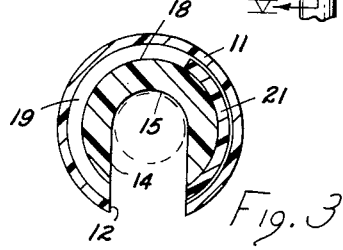
FIGURE 3 is a sectional view taken along the line III—III of FIGURE 2.
Figure 4:
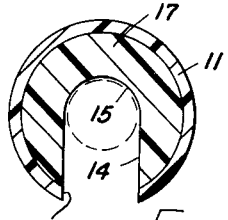
FIGURE 4 is a sectional view taken along the line IV—IV of FIGURE 2.

The arcuate, closure member 21 (FIGURE 3) is arranged concentrically and is circumferentially slidable within the casing 11. The member 21 is of lesser radius than said casing but is of substantially greater arcuate extent than the slot 12 so that it can fully close said slot whereby a transmission line received within the casing 11 can be fully enclosed in order that a lineman's fingers or tools cannot contact said line. The closure member 21 slidably engages and is supported by the portions 18 of the end plugs 13 which, in effect, act as bearings for supporting the closure member in its arcuate movement.

The casing 11 and the closure member 21 are made of electrical insulating material and preferably are made of fiber glass fabric impregnated with and bonded together by a suitable resin, such as an epoxy resin.

Figure 5:
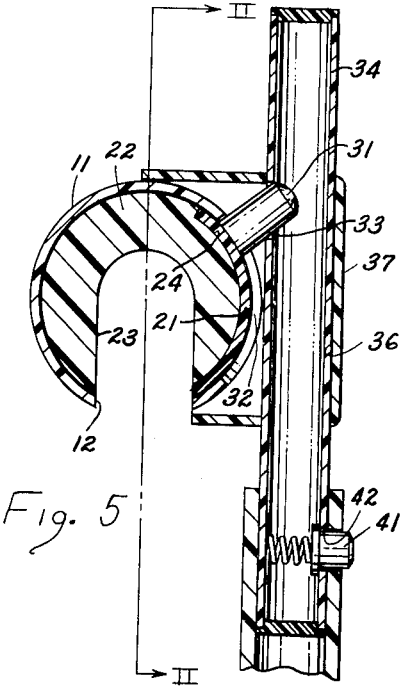
FIGURE 5 is a sectional view taken along the line V—V of FIGURE 2 and showing the parts in one position.
Figure 6:
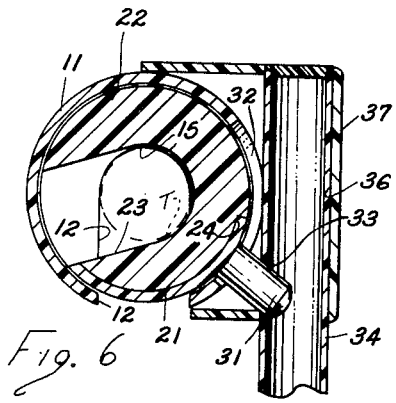
FIGURE 6 is a sectional view corresponding to FIGURE 5 and showing the parts in another position.

If desired, and depending upon the length of the casing 11, one or more intermediate guides 22 made of insulating material, preferably the same material as the end plugs 13, may be fixedly secured to said closure member 21 in spaced-apart relation therealong so that they are rotatable with the member 21 and within the casing 11. Here, one such guide 22 is provided at the midpoint of the casing. The guide 22 is circular and its diameter is only slightly less than the internal diameter of the casing 11 so that it can rotate therein but is otherwise closely guided thereby. The guide 22 has a slot 23 which is alignable with the opening 12 when the closure member 21 is in a position not blocking the opening 12 (FIGURE 5). However, the guide 22 can rotate with the closure member 21 to a position in which the slot 23 is out of alignment with the opening 12 (FIGURE 6). The guide 22 has an acruate portion 24 of reduced diameter in the periphery thereof and the closure member 21 is received in and is fixedly secured to said arcuate portion, such as by a suitable adhesive.

Thus, the axial ends of the closure member 21 slidably engage and are guided in their arcuate movement by the inner end portions 18 of the end plugs 13, while the intermediate guide 22 affixed to said closure member is close to and slidable with respect to the internal surface of the casing 11. This insures a closely guided movement of the closure member 21 to assure proper operation thereof.

A pin 31 (FIGURES 5 and 6), made of insulating material, is affixed to closure member 21 and projects radially outwardly therefrom through an elongated circumferential slot 32 in the casing 11. The pin 31 is movable within the slot 32 between an upper (FIGURE 5) position, in which the closure member 21 does not block the opening 12, and a lower (FIGURE 6) position in which said closure member closes off said opening 12.

The pin 31 extends through an opening 33 into the interior of a hollow tube 34. The tube 34 extends through and is slidable longitudnially within an elongated passage 36 defined by the boss 37 on the mounting bracket 38. The bracket 38 is made of rigid insulating material, preferably a fiber glass reinforced material or the same material as the end plugs 13, and is affixed to the casing in any suitable manner, such as by a suitable adhesive. The opening 33 is of sufficiently greater length than the diameter of the pin 31 so that said pin can move between the FIGURE 5 and FIGURE 6 positions therein. Further, the passage 36 extends substantially tangentially to the casing 11 at the side thereof. Thus, movement of the tube 34 through the passage 36 in a direction substantially perpendicular to the opening 12 will effect arcuate movement of the closure member 21 around the lengthwise axis of the casing 11 in order to open or close the opening 12.

A spring-urged, retractable pin 41 (FIGURE 5) extends laterally through an opening 42 close to the lower end of the tube 34. A hollow handle member 43 of any suitable length can be sleeved upon the tube 34 and it has a lateral opening 44 adjacent its upper end through which the pin 41 is extendable to releasably lock the handle member 43 to the tube 34. Thus, lengthwise movement of said handle member can effect corresponding movement of the tube and thereby effect arcuate movement of the closure member 21. The handle member 43 can be detached from the tube 34 by moving the pin 41 into the tube and then sliding the handle member axially along the tube.

If desired, one end of the casing 11 may be provided with an integral extension 46 having an opening 47 therethrough. The cover 10 in may thus be coupled with another cover 10a by passing a pin 48 on said cover member 10a outwardly through said opening 47.

*Operation*

In use, the cover 10 is applied usually by moving it upwardly from below the transmission line about which it is to be placed. When the cover 10 is lifted by the handle member 43, the tube 34 is automatically moved to its uppermost position (FIGURE 5) in the bracket 38 due to the force of gravity acting on the casing 11. Accordingly, the closure member 21 is positioned to one side of the opening 12 so that the transmission line can be received into the casing 11 through said slot, as the casing is moved downwardly, and can engage the inner ends of the slots in the plugs 13 and guide 22 whereby the cover will rest on said line.

When the weight of the casing 11 and the bracket 38 is supported on the energized line, the handle member 43 and the tube 34 are then permitted to drop downwardly by gravity until the pin 31 engages the bottom end of the slot 32. Such movement of the tube 34 effects arcuate movement of the closure member 21 so that it assumes its FIGURE 6 position extending across the opening 12 whereby the energized line is completely enclosed by the cover 10. It is to be noted that when the closure member 21 extends across the opening 12, the slot 23 in guide 22 and the slots 14 in the plugs 13 are disposed at 90 degree angles to each other. This arrangement holds the casing against any substantial radial movement with respect to the transmission line while permitting sliding movement of the cover, when properly urged, along the transmission line.

Thus, the cover can be easily, conveniently and quickly mounted and removed by a lineman while he is at an appreciable safe distance away from the energized line. The movement of the cover parts is effected solely by the operation of the handle member 43, and the working parts of the cover respond automatically to movement of the handle member. Once the cover is mounted on the line, the line is completely enclosed so that a lineman's fingers and tools cannot accidentially come into contact with the enclosed portion of the line.

While a particular preferred embodiment of the invention has been described, the invention contemplates such changes or modifications therein as lie within the scope of the appended claims.

What is claimed is:

1. A protective cover comprising:
   an elongated outer tubular casing of insulating material having an opening through the wall therof extending lengthwise between and through the ends thereof, said casing also having an elongated lateral slot through the side thereof;
   an elongated inner closure member of insulating material mounted for arcuate movement within said casing between a first position in which it is disposed away from said opening and a second position in which it extends across and closes off said opening;
   an operating pin extending through the slot in the side of said tubular casing and movable along said slot and drivingly connected to said closure member for effecting arcuate movement thereof with respect to said casing;
   a mounting structure affixed to said tubular casing on the outside thereof and having wall means defining an opening therethrough which opening extends substantially perpendicularly to the lengthwise extent of the casing;
   an elongated handle slideably disposed in said opening in said mounting structure for lengthwise movement and drivingly connected to said operating pin whereby lengthwise movement of said handle moves said operating pin in said slot and thereby moves said inner closure member between said positions.

2. A protective cover according to claim 1 in which said mounting structure supports said handle for lengthwise sliding movement in a direction substantially tangent to the external surface of said casing at a point substantially midway between said opening in said casing and the opposite wall portion of said casing.

3. A protective cover according to claim 2, in which the mounting structure includes a bracket affixed to said casing approximately midway between the axial ends of the casing and embracing at least about one-half of the periphery of the casing beginning adjacent one end of said opening in said casing.

4. A protective cover according to claim 1, in which end plugs are affixed to and disposed within said casing adjacent to the longitudinal ends thereof, said end plugs having slots extending part way therethrough in a direction transverse to the longitudinal axis of said casing, the open outer ends of said slots being aligned with said opening and the closed inner ends of said slots being spaced radially inwardly from the interior surfaces of said casing and said closure member.

5. A protective cover according to claim 4, in which the end plugs have axially inner end portions of reduced diameter whose external surfaces are spaced from the interior surface of said casing, the axial ends of said closure member being received in the space between said end portions and said interior surface of said casing and being slidably supported by said end portions.

6. A protective cover according to claim 1, in which an intermediate guide is affixed to said closure member and is disposed within said casing, said intermediate guide having a slot extending part way therethrough in a direction transverse to the longitudinal axis of said casing, the open outer end of said slot being aligned with said opening when said inner closure member is in its first position and being out of alignment with said opening when said inner closure member is in its second position, the closed radially inner end of said slot being spaced radially inwardly from the interior surfaces of said casing and said closure member.

References Cited by the Examiner
UNITED STATES PATENTS

| | | | |
|---|---|---|---|
| 2,132,204 | 10/38 | Davis et al. | 74—99 X |
| 2,430,703 | 11/47 | Bowen | 174—5 |
| 2,908,742 | 10/59 | Murphy | 174—35 |

JOHN F. BURNS, *Primary Examiner.*

JOHN P. WILDMAN, E. JAMES SAX, *Examiners.*